June 3, 1952  O. V. DE BOGART  2,599,155
HIGH-SPEED BORING MACHINE
Filed July 1, 1948  3 Sheets-Sheet 2
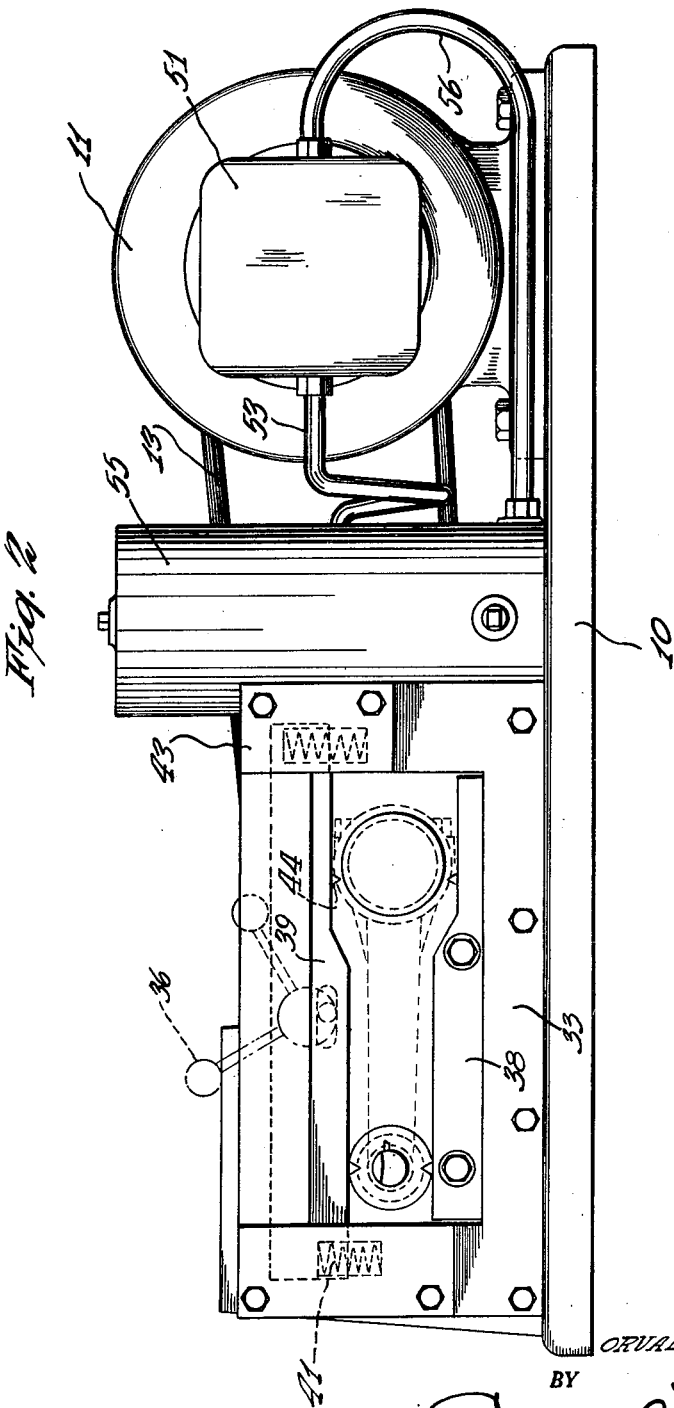
INVENTOR.
ORVAL VAN DE BOGART
BY
Carl Miller
ATTORNEY June 3, 1952  O. V. DE BOGART  2,599,155
HIGH-SPEED BORING MACHINE
Filed July 1, 1948  3 Sheets-Sheet 3
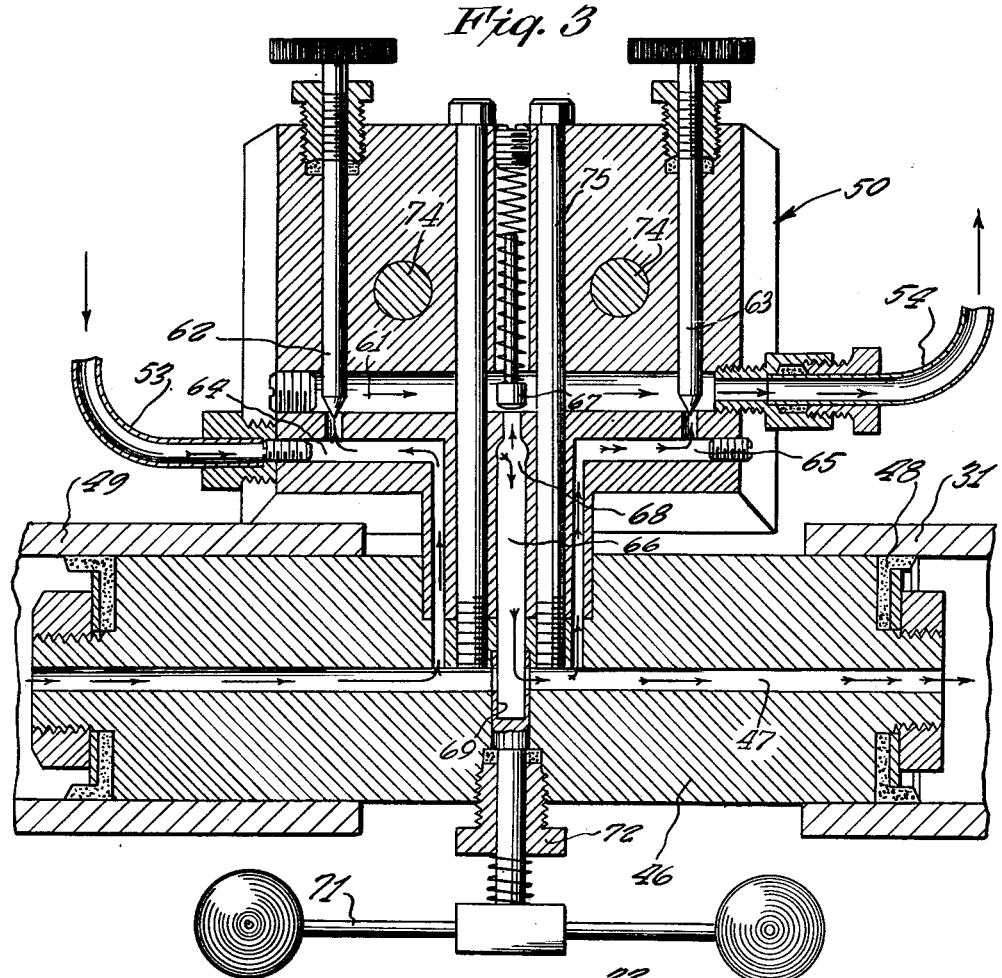
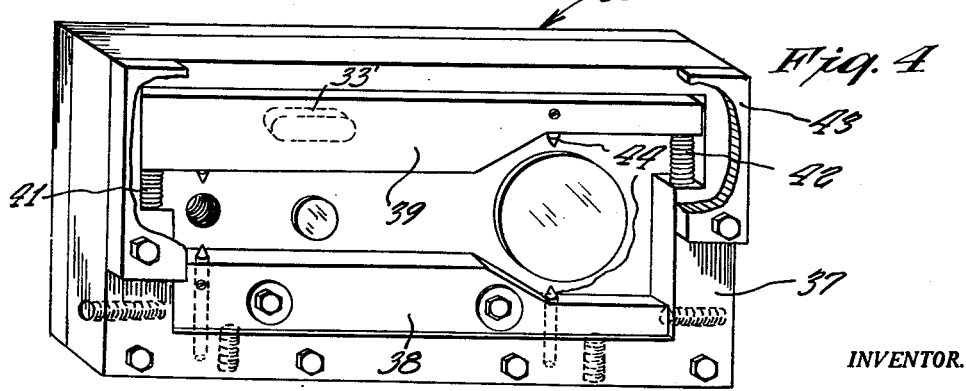
INVENTOR.
ORVAL VAN DE BOGART
BY
Carl Miller
ATTORNEY Patented June 3, 1952

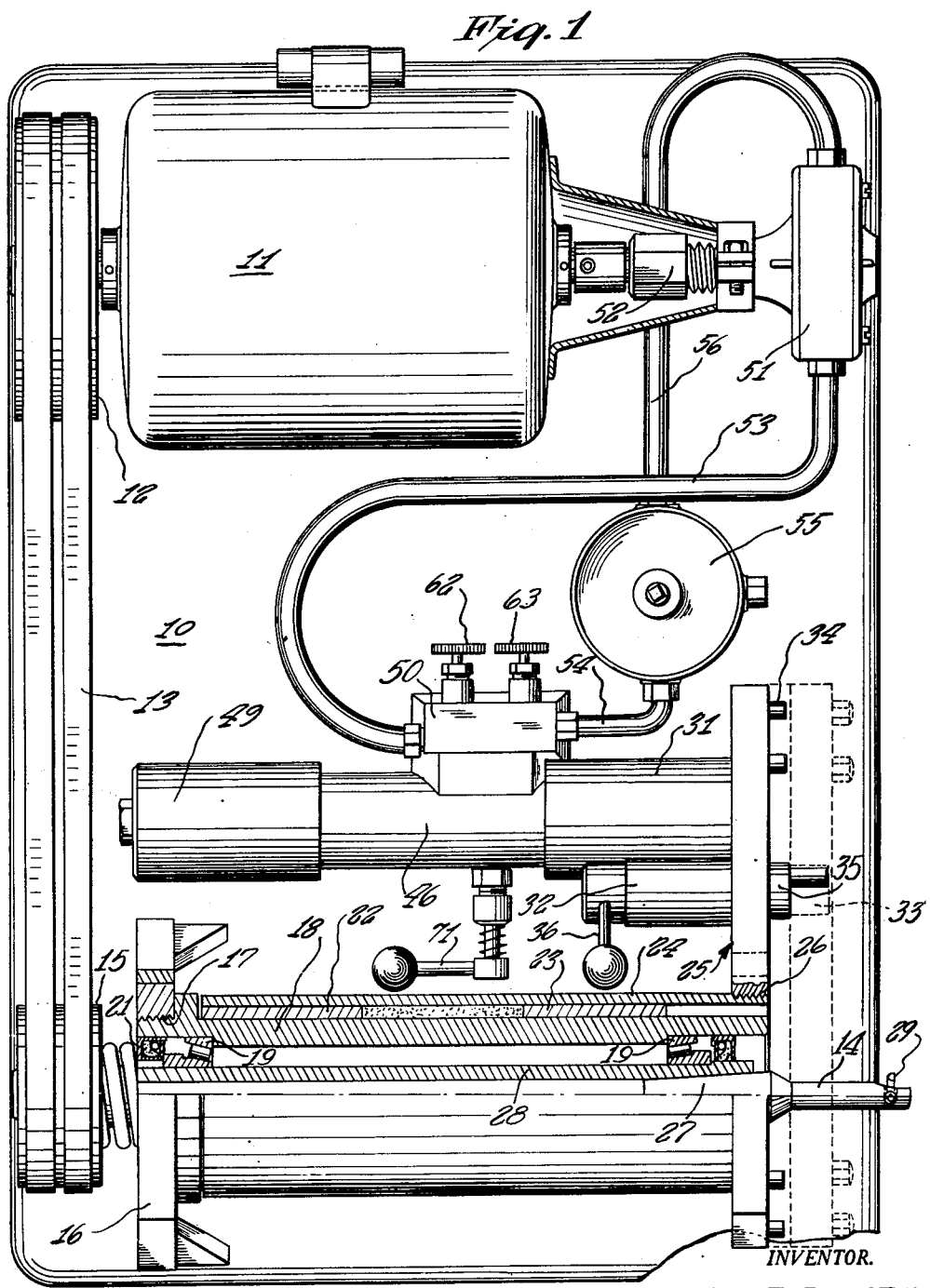

2,599,155

UNITED STATES PATENT OFFICE 2,599,155

HIGH-SPEED BORING MACHINE

Orval Van De Bogart, Seattle, Wash.

Application July 1, 1948, Serial No. 36,399

1 Claim. (Cl. 77—3)

This invention relates to a high speed boring machine.

It is an object of the present invention to provide a high speed boring machine particularly adapted for boring engine connecting rod bushings, cam shaft bearings, bushings for small gears, resizing main shaft bearings, connecting rod bearing halves and so forth, all at high speed whereby to reduce labor costs and to increase the work which one mechanic may do over a given period of time.

Other objects of the present invention are to provide a high speed boring machine adapted for the above-described work which is of simple construction, easy to adjust, consumes little space, produces an accurate and finely finished bore, may do a large number of bushings without being reset or sharpened, operates with a carboloy cutting tip, is durable and rigid, inexpensive to manufacture and efficient in operation.

For other objects and for a better understanding of the invention, reference may be had to the following detailed description taken in connection with the accompanying drawing, in which Fig. 1 is a top plan or layout view of the high speed boring machine embodying the features of the present invention, portions being broken away and shown in section whereby to show the interior of certain of the parts, Fig. 2 is a front elevational view of the boring machine, Fig. 3 is an enlarged sectional view of the hydraulic control mechanism.

Fig. 4 is a perspective view of the work holding jig.

Referring now to the figures, 10 represents a base on which is mounted an electric motor 11 having double V-pulley 12 to which is connected V belts 13 for driving spindle assembly 14, the belts connecting with V-pulleys 15 thereon. On the base 10 is a bracket 16 which is internally threaded as indicated at 17 to receive spindle bearing housing 18. The housing 18 is made from steel tubing and is threaded at one end to enter the bracket 16. The housing 18 is machined on each end to receive a bearing 19 and an oil seal 21. On the outside of the housing 18 are rings 22 and 23 which support for slidable adjustment, work holder sleeve 24 having holder 25 threaded as indicated at 26 to one end thereof.

The spindle 14 is tapered at 27 to fit tapered surface of spindle bearing housing 28, within the bearings 19. The tapered joint insures perfect centering of the various types of boring spindles 14. The spindle 14 has a carboloy cutting tip 29.

To the holder 25 there is connected a hydraulic cylinder 31 and a cam shaft housing 32. To the opposite face of the holder 25 there is connected a work holder clamp 33, Fig. 4, adapted to retain the work piece which is to be bored. The work holder 25 has locating dowels 34 for receiving the work holder clamp. The operating cam 35 extends into the housing 32 and is operated by handle 36 extending from the cam shaft housing 32.

The work holder clamp 33 comprises a frame 37 having a stationary jaw 38 which can be adjusted but which remains fixed once in the adjusted position. Within the frame is an adjustable jaw 39 supported on springs 41 and 42 which is operated by cam 35 extending through opening 33', Fig. 4, therein. Plates 43 retain the springs and the movable jaw in place within the frame 37. The jaws respectively have adjustable centers 44 which engage the work piece.

The cylinder 31 has a piston 46 operable therein, Fig. 3. This piston has an oil passage 47 extending through its center. A leather oil seal assembly 48 is provided on each end of the piston 46. A cylinder 49 is provided on the opposite end of the piston 46. Connected to the piston 46 and extending from the side thereof is a control box 50. Electric motor 11 has a pump 51 connected to it through a coupling arrangement 52. This pump delivers oil under pressure through pipe 53 to control box 50. The oil is returned through pipe 54 from the control box to reservoir 55. A pipe 56 extends from the reservoir 55 to the pump 51.

The control box has a passage 61 with two needle valves 62 and 63 extending therein. These needle valves cooperate respectively with openings 64 and 65 for regulating the speed of travel of the work as it moves back and forth. Also extending into the passage 61 and cooperating with a central passage 66 is a by-pass valve element 67. The passage 61 is connected with the pipe 54 leading to the reservoir 55. Pipe 53 leads to a passage 68 through which oil is extended under pressure to passage 66. A sleeve valve element 69 extends from the opposite side of the piston 46 to control the oil leaving passage 66. This sleeve valve is turned by a handle 71. The sleeve valve extends through a fitting 72 in the piston 46. As the valve sleeve 69 is turned, the sleeve 31 will be extended and at other times the oil will simply bypass to the reservoir 55.

The control box 50 is fixed to the base by bolts as indicated at 74, Fig. 3. The piston 46 is fixed to the control box by bolts 75 and it remains fixed therewith. The sleeves 31 and 49 are connected together to slide on the piston 46. Accordingly, with the sleeve 31 being connected to the work holder 25, the sleeve 24 will be slid along the bearing sleeve assembly so that the work piece is moved relative to the spindle 14.

When a new work piece is to be inserted in the work holder clamp, the cam arm 36 is adjusted. The arm 71 is moved back and forth to change the direction of movement of the work holder 25. The speed of movement in each direction is regulated by throttle valve elements 62 and 63.

In operation, a spindle sleeve 28 is rotated within the spindle sleeve housing 18 by pulley belt connection 13 between the spindle sleeve 28 and the electric motor 11. The spindle sleeve carries the spindle 14 with a cutting tip 29. The spindle sleeve housing 18 is supported on the bracket 16. The guide sleeve 24 is adjustable on the spindle sleeve housing 18 and has threaded thereto the work holder 25. Work holder clamp 33 is carried on the work holder 25.

By turning the handle 36 the work is made secure between the jaws 38 and 39 of the work holder clamp, Fig. 4. With the work piece in place, the operation can be started.

Piston 46 is connected to the work holder 25, and the sleeve 31 will move according to the setting of the throttle valves 62 and 63 to carry the work by means of the clamp onto the tool 29 to effect a cutting operation thereof. By setting either of the valves 62 or 63 the speed of outward movement of the holder or the speed of inward movement of the holder will be controlled. A cut will be first made in one direction and then in the opposite direction. If desired, the return movement of the cutting tool can be effected with higher speed than with the first cutting movement or vice versa.

While various changes may be made in the detail construction, it shall be understood that such changes shall be within the spirit and scope of the present invention as defined by the appended claim.

Having thus set forth and disclosed the nature of my invention, what is claimed is:

In combination with a boring machine, a base, a hollow spindle bearing housing fixed at one end to the base, a spindle assembly journaled in the spindle bearing housing and having a cutting element extending therefrom, a work holder sleeve slidable upon the spindle bearing housing, a horizontally extending work holding plate fixed at one end to said work holder sleeve, power means connected to the opposite end of the work holder plate including a piston and a movable sleeve slidable upon the piston and fixed at one end to the work holder plate, a manually adjustable cam device mounted on the plate and projecting forwardly therefrom, said work holding plate having centering projections, a work holder clamp connected to the work holder plate and having openings receiving the centering projections on the work holder plate and the cam device portion, said work holder clamp including a frame having a fixed jaw and a jaw movable in the frame toward and away from said fixed jaw, said movable jaw having an opening receiving the manually adjustable cam device whereby the movable jaw can be operated by the device, said jaws being adapted to receive a work piece and adapted to hold the same in alignment with the cutting element.

ORVAL VAN DE BOGART.

REFERENCES CITED

The following references are of record in the file of this patent:

UNITED STATES PATENTS

| Number | Name | Date |
|---|---|---|
| 1,352,646 | Baltzley | Sept. 14, 1920 |
| 1,887,379 | Orr | Nov. 8, 1932 |
| 2,146,446 | Schmidt et al. | Feb. 7, 1939 |
| 2,181,055 | Hirvonen | Nov. 21, 1939 |